July 6, 1937. W. C. BAILEY 2,086,206
PRODUCTION OF SALT CAKE AND HYDROGEN CHLORIDE
Filed Feb. 21, 1936
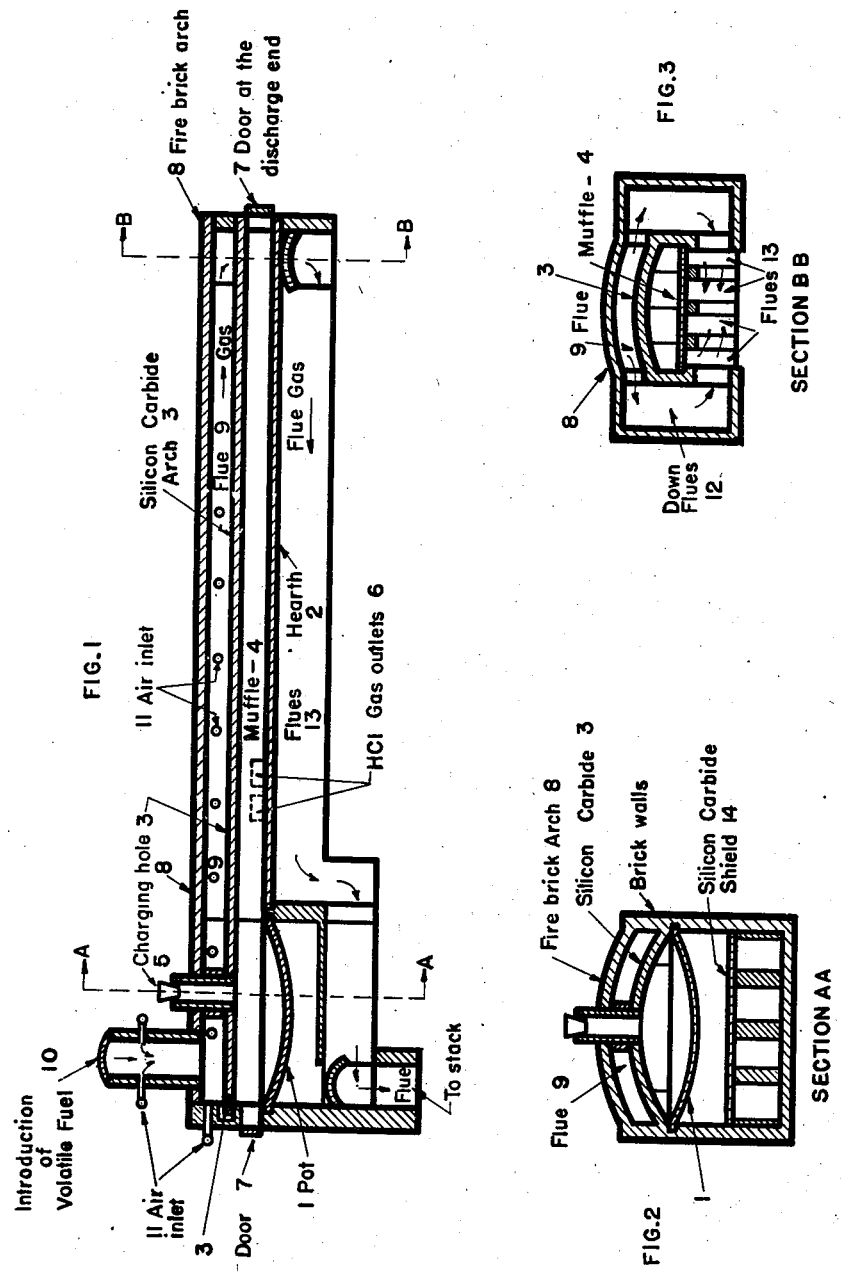
INVENTOR.
WALDO C. BAILEY
BY George Lee
ATTORNEY.

Patented July 6, 1937

2,086,206

UNITED STATES PATENT OFFICE 2,086,206

PRODUCTION OF SALT CAKE AND HYDROGEN CHLORIDE

Waldo Conkling Bailey, Shaker Heights, Ohio, assignor, by mesne assignments, to E. I. du Pont de Nemours & Company, Wilmington, Del., a corporation of Delaware Application February 21, 1936, Serial No. 64,997

4 Claims. (Cl. 23—277)

The present invention relates to a novel arrangement and construction of a salt cake furnace, and consists in the combination of a pot adapted to receive the liquid mixture of sulfuric acid and common salt (sodium chloride) and to heat it until a soup of unreacted sulfuric acid, salt and sodium bisulfate is formed, a hearth upon which said soup is delivered and on which the reaction is continued until sodium sulfate is formed, the distinguishing various novel features in my salt cake furnace being a single gas space above said pot and hearth into which the hydrogen chloride gas is delivered, indirect heating of the reaction mass both in the pot and on the hearth, with a single combustion gas system for circulation around the pot and said hearth, the latter forming thereby a muffle, the circulation of the heating gas proceeding from above the pot, above the muffle, then below the muffle and below the pot to the stack; control of the heating by admission of the combustion air at various points along the course of said combustion gas and use of silicon carbide refractories in the construction of the separation arches between the gas space containing the hydrogen chloride and the combustion zone containing the hot combustion gases.

The attached Figure 1 shows a side elevation of a salt cake furnace built according to my invention; Figs. 2 and 3 are elevations along the lines A—A and B—B of Fig. 1.

It has been customary in pot-hearth type salt cake furnaces to separately heat the pot and the hearth, the pot being heated from beneath and the charge in the hearth being in direct contact with the fire gases. This made it advisable to separately recover and absorb the hydrogen chloride gases formed, the gases from the pot being highly concentrated and adapted to make strong hydrochloric acid; the hydrogen chloride evolved on the hearth was diluted with combustion gases and dilute hydrochloric acid could only be directly obtained from hearth gases.

In other pot-hearth type furnaces, the hearth has been heated indirectly but here again, with separate heating provided for both, the gases evolved were separately recovered and absorbed.

It has, however, in all these installations been the absolute practice to heat the pot from below. These manners of operating salt cake furnaces of the non-mechanical type result in large repair costs, particularly frequent replacements of the cast iron pots are required.

According to my invention I apply the maximum heat above the pot and hearth through a silicon carbide refractory arch, and the bottom of the hearth and pot is then only heated by the flue gases after combustion. Additional protection can then be had for the cast iron pot by shielding its bottom from the fire gases by a row of silicon carbide refractory tile.

In the appended drawing, 1 is a cast iron pot set in a fire brick structure. The lip of the pot is flush with the hearth 2. The two are covered by a single silicon refractory arch 3, forming muffle 4; an opening with sleeve 5 in the arch above the pot serves as a charging hole for the salt and acid; openings 6 in the side walls of the muffle provide for outlets of the HCl gas formed which, from these holes, is led to an absorption system, not shown. Doors 7 at both ends of the muffle permit the introduction of raking and spreading tools needed to transfer the soup out of the pot, to spread it over the hearth and finally to take the salt cake out of the furnace. A convenient type of tool useful for this purpose, is, for instance, described in United States Patent 1,713,418. Above the arch 3, there is a fire brick arch 8, leaving between the two an upper flue 9 in which a volatile fuel is introduced through 10 above the pot. Air inlets or ports 11 are located all along the flue 9, and through varying the admission of air through these inlets the combustion of the volatile fuel is controlled so that the required temperatures are obtained in the pot 1, and on the hearth 2. The combustion gases are led downwards at the discharge end of the muffle through down flues 12 into the return flues 13, which pass beneath the hearth 2 and pot 1, and are led to a stack, not shown. A row of silicon carbide refractory tile forms a shield 14 under pot 1 so that the still hot combustion gases do not come in direct contact with the metal of pot 1, whereby its life is greatly prolonged.

In operating this furnace, the charge of salt is dumped into the pot through charging hole 5 and then hot sulfuric acid (about 62° Bé.) is slowly run in through the same hole. The acid addition is regulated by the operator so that the gas evolution is fairly uniform and the charge does not foam over. When the charge is about 60% reacted, and has become a semi-fluid mush or soup, it is dragged upon the hearth of the muffle by means of the tools introduced through doors 7; there it is spread out and is periodically rabbled and plowed. After the pot charge has been put upon the hearth, the next charge is put into the pot, so that two charges, one in the pot and one on the hearth, are in process at the same time. Temperatures are maintained by controlling the combustion in flue 9 so that the pot and muffle reactions take about the same time for completion. The salt cake formed on the hearth is raked out just before the pot charge is ready for transfer to the hearth.

The HCl gas from both the pot and hearth is withdrawn through common ports in the side wall of the muffle.

The use of silicon carbide refractories in the arch over the pot makes it possible to put all or almost all of the heat required by the pot charge in from above, thus making it possible to run at high burdens without maintaining a high temperature under the pot and thereby causing thermal strains which result in pot failures.

The high pot repairs which would obtain if high burdens were run with heat input from below formerly limited the capacity of such a system, whereas the capacity of the pot is greatly increased by this novel heating from above. In changing over a system in which the pot was heated from below and the charge in the hearth heated directly by combustion gases, to a system according to the present invention, without changing the dimensions of the pot or hearth, the capacity of the system has been increased 50%.

Further advantage resulting from this overhead heating is that when the pot is made of metal there is less attack of the acid and the resulting salt cake contains less iron contamination as in the case of iron pots heated entirely from below.

By completely eliminating the under-firing of the pot and applying all heat through the arch above the pot, I can replace the cast iron pot by another receptacle, preferably bowl shape and lined with a suitable acid and heat resisting tile, and thereby further improve the qualities of the salt cake produced, or I can line the cast iron pot with a non-metallic acid and heat resistant lining of tile so that the reacting mixture of acid and salt does not come in contact with the metal of the pot.

I claim:

1. In a salt cake furnace for the production of sodium sulfate and hydrogen chloride gas, the combination of a pot adapted to receive and heat sulfuric acid and common salt, a hearth adapted for further heating the reacting mixture of acid and salt obtained in said pot, a muffle within which a single gas space extends over the reaction mixture contained in both said pot and hearth, adapted to receive the gaseous hydrogen chloride produced in said pot and on said hearth and to lead said hydrogen chloride to an absorption system, a combustion space surrounding both said pot and hearth, separated from said gas space, and adapted to burn a volatile fuel, means to admit the volatile fuel into the combustion space above said pot and to circulate the combustion gases on top of said muffle, returning them under the muffle, air ports in said combustion space throughout its length above said muffle adapted to regulate the admission of air into said combustion space and thereby regulate the combustion of said volatile fuel and the temperature in said gas space, and silicon carbide refractories forming the separating partition between said gas space and said combustion space.

2. The salt cake furnace of claim 1 in which the hot combustion gases are passed under said pot and a silicon carbide refractory is interposed between the bottom of said pot and the hot combustion gases.

3. In a salt cake furnace of the type comprising a pot and a hearth provided with a single gas space for collecting hydrogen chloride, an inlet above the pot for admitting a heating fluid and thereby first applying heat to the pot roof, a passage above the hearth for next conveying the heating fluid from above the pot along the hearth roof, a passage below the hearth for next conveying the heating fluid from above the hearth along the hearth floor, and a passage associated with the pot for finally conveying the heating fluid from below the hearth and directing it towards the lower portion of the pot and in indirect heat exchange relation thereto.

4. In a salt cake furnace of the type comprising a pot and a hearth provided with a single gas space for collecting hydrogen chloride, a fuel inlet above the pot, means for admitting air whereby a major portion of the heating value of the fuel is developed and applied at the pot roof, and means for applying successively lesser portions of heat to the top of the hearth, the floor of the hearth, and the bottom of the pot.

WALDO CONKLING BAILEY.